United States Patent [19]

Cotter

[11] 4,366,379
[45] Dec. 28, 1982

[54] ISOTOPE SEPARATION APPARATUS AND METHOD

[75] Inventor: Theodore P. Cotter, Los Alamos, N. Mex.

[73] Assignee: The United States of America as represented by the United States Department of Energy, Washington, D.C.

[21] Appl. No.: 912,783

[22] Filed: Jun. 5, 1978

Related U.S. Application Data

[63] Continuation of Ser. No. 452,764, Mar. 19, 1974, abandoned.

[51] Int. Cl.$^3$ ............................................. B01D 59/00
[52] U.S. Cl. ........................................ 250/251; 55/17; 204/DIG. 11; 331/DIG. 1; 423/3
[58] Field of Search ....................... 250/251, 288, 290; 331/DIG. 1; 55/17; 204/DIG. 11, 157.1 R; 423/3

[56] References Cited

U.S. PATENT DOCUMENTS 3,558,877 1/1971 Pressman ...................... 331/DIG. 1
3,710,279 1/1973 Askin .................................... 55/17
3,808,550 4/1974 Askin ..................................... 176/1

OTHER PUBLICATIONS

Nuclear Eng. Intl. vol. 19, No. 213, Feb. 1974, p. 68.
Nuclear News, Jun. 1975, p. 111.

*Primary Examiner*—Deborah L. Kyle

[57] ABSTRACT

The invention relates to a method and apparatus for laser isotope separation by photodeflection. A molecular beam comprising at least two isotopes to be separated intersects, preferable substantially perpendicular to one broad side of the molecular beam, with a laser beam traveling in a first direction. The laser beam is reflected back through the molecular beam, preferably in a second direction essentially opposite to the first direction. The laser beam comprises $\pi$-pulses of a selected wavelength which excite unexcited molecules, or cause stimulated emission of excited molecules of one of the isotopes. Excitation caused by first direction $\pi$-pulses moves molecules of the isotope excited thereby in the first direction. Stimulated emission of excited molecules of the isotope is brought about by returning $\pi$-pulses traveling in the second direction. Stimulated emission moves emitting molecules in a direction opposite to the photon emitted. Because emitted photons travel in the second direction, emitting molecules move in the first direction. Substantial molecular movement is accomplished by a large number of $\pi$-pulse-molecule interactions. A beam corer collects the molecules in the resulting enriched divergent portions of the beam.

14 Claims, 4 Drawing Figures

Before        After

Absorption

Spontaneous
Emission

Stimulated
Emission

ISOTOPE SEPARATION APPARATUS AND METHOD

The invention described herein was made in the course of, or under, a contract with the U.S. Atomic Energy Commission.

This is a continuation of application Ser. No. 452,764, filed Mar. 19, 1974, now abandoned.

FIELD OF THE INVENTION

The invention relates to particle separation and more particularly to laser isotope enrichment and separation by photodeflection.

BACKGROUND OF THE INVENTION

Isotopes have innumerable medical, industrial and scientific applications. In particular, for various nuclear applications, it is important to be able to separate the fissile isotope $^{235}U$ from, or to strongly enrich $^{235}U$ in admixtures with, other isotopes of uranium.

For many years, gaseous diffusion has been the only process by which $^{235}U$ isotope enrichment and separation has been carried out. Gaseous diffusion plants are large and expensive operations which, although clearly operational, leave much to be desired by way of efficiency.

Very recently, a most promising solution has come with the advent of high output lasers, and in particular, high output lasers which operate in the infrared portion of the electromagnetic spectrum, such as $CO_2$ lasers.

It is known that by controlling the spectral frequency of the light interacting with matter it is possible to produce selective reactions that can change the composition and properties of the matter. The conditions required to achieve such selectivity are (1) high monochromaticity of the exciting light; and (2) the selectivity of the primary process of light interaction with the matter (the existence of narrow nonoverlapping absorption lines). See, e.g., R. V. Ambartzumian and V. S. Letokhov, "Selective Two-Step (STS) Photoionization of Atoms and Photodissociation of Molecules by Laser Radiation," 11 Applied Optics 354 (1972), V. S. Letokhov, "Use of Lasers to Control Selective Chemical Reactions," 180 Science 451 (1973), and A. Ashkin, "The Pressure of Laser Light," Scientific American, March (1972).

The first condition can readily be met by lasers. The art discloses that the second condition presents substantial difficulties but can be achieved provided there exist certain discrete electronic and vibrational transitions of the matter in the gaseous phase. As a practical matter, it is frequently difficult to ascertain in a gaseous species which transitions are appropriate for selective interaction with tuned laser light.

The literature, however, discloses how this particular problem can, in principle, be readily overcome. It is known that if molecules containing a mixture of isotopic species of a particular element are irradiated with laser light tuned to excite molecules containing only a particular isotopic species of the element, only those molecules containing that particular isotopic species will be excited by the laser light, and that such excited molecules will move in the direction that the photon absorbed was moving, because of the absorbed momentum of the photon. It is also well known that molecules so excited can be stimulated to emit a photon by another photon-molecule interaction and that a molecule undergoing stimulated emission moves in a direction opposite to the direction the emitted photon moves. The molecule will emit a photon when stimulated, in the direction the stimulated photon was moving before collision with the molecule.

The apparatus and method of the instant invention essentially depend on these physical steps in carrying out the invention.

SUMMARY OF THE INVENTION

In accordance with the present invention, there is provided an apparatus and method for laser isotope enrichment and separation. A molecular beam containing at least two isotopes of a particular substance is intersected by a laser beam traveling in a first direction, preferably substantially perpendicular to one broad side of the molecular beam. The laser beam comprises $\pi$-pulses of light of a wavelength selected to excite, if unexcited, and cause stimulated emission, if excited, of the molecules of only one of the isotopes within the beam. Excitation of certain molecules of one isotope by the $\pi$-pulses of the laser beam causes them to move in the first direction. Similarly, laser light $\pi$-pulses are caused to impinge in a second direction onto the other broad side of the molecular beam, preferably perpendicular thereto. This light stimulates the excited molecules to emit and move in a direction opposite to the second direction. The first and second directions are essentially opposite in a preferred embodiment of the invention, and produced therein by a laser and a reflector disposed opposite one another on either side of and perpendicular to the broad side of the molecular beam. Thus, as the molecular beam passes through the laser beams, molecules responsive to $\pi$-pulses of the selected wavelength are excited, and move in the first direction. The $\pi$-pulses in the second, returning beam stimulate the excited molecules to emit, thereby moving them opposite to the second direction, which, in the preferred embodiment, is essentially the first direction. A large plurality of these events causes the affected molecules to substantially move in the first direction (sideways) to the direction of travel of the molecular beam. Therefore, the light responsive molecules in the molecular beam diverge from the main or central beam into separate isotope enriched portions for collection. A preferred embodiment of the invention achieves an effective beam divergence of on the order of about 4 degrees to about 7 degrees from center.

One object of the present invention is to provide efficient physical isotope separation by photodeflection.

Another object of the invention is to provide relatively wide divergence into two enriched portions for collection of a molecular beam comprising at least two isotopes of a particular substance.

Yet another object of the invention is to provide faster isotope enrichment and separation than possible with prior art gaseous diffusion systems.

One advantage of the present invention is that it provides far more efficient isotope enrichment and separation than possible with prior art gaseous diffusion systems.

Another advantage of the present invention is that in accordance therewith, less physical space is required to carry out isotope separation than with prior art gaseous diffusion systems.

Still another advantage of the present invention is that in accordance therewith, less energy is used in acquiring a particular enriched specimen than with prior art gaseous diffusion systems.

Other objects and advantages of the present invention will be apparent to those skilled in the art from the following description, with reference to the appended drawings, wherein like characters denote like parts, and wherein:

FIG. 1a illustrates molecular photon absorption;
FIG. 1b shows molecular spontaneous emission;
FIG. 1c illustrates molecular stimulated emission; and
FIG. 2 is a schematic showing of a preferred embodiment of an apparatus for carrying out the invention.

DETAILED DESCRIPTION OF THE INVENTION

Figure 1A:
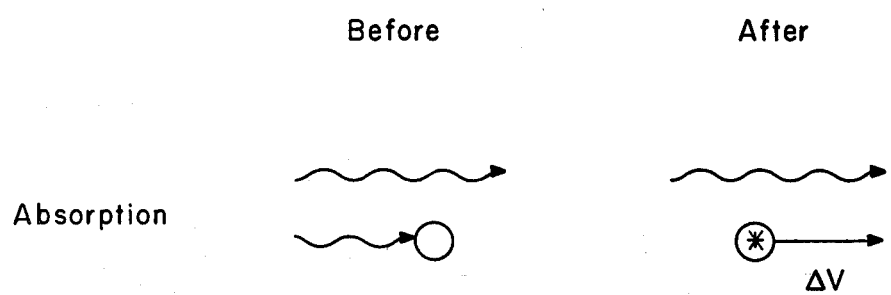

For every molecule, there is a minimum energy state called the ground state. Above this ground state are additional discrete energy states. A molecule in the ground state or excited to a particular energy state may be excited to a higher energy state by absorption of radiation of the proper frequency. In accordance with quantum theory, molecular spectra show that the energy states of a molecule correspond to (a) different electronic orbits, (b) different internuclear distances, (c) rotations of some elements of the molecule with respect to other elements of the molecule, or (d) particular combinations of these. The optical spectrum of energy absorbed when the molecule is excited from one energy state to another may thus consist of (a) a vibrational spectrum, (b) a rotational spectrum, or (c) a compound spectrum, e.g., a vibrational-rotational spectrum or a vibrational-electronic-rotational spectrum. For a polyatomic molecule no pure electronic absorption spectrum is possible.

In molecules containing different isotopes, the classical vibration frequencies differ according to $$|\Delta \nu| = \tfrac{1}{2}(\Delta \mu / \mu)\nu \qquad (1)$$

where $\nu$ is the vibration frequency, and $\mu$ is the reduced mass of the molecule. The reduced isotopic mass difference $\Delta \mu$ is nonzero only if the isotopic atoms are in motion during the vibration. The resultant difference in frequency, $\Delta \nu$, is called the isotope shift. The isotope shift causes the absorption spectrum of molecules containing one isotopic species of an element to be somewhat shifted from that of molecules containing another isotopic species of that element. If the shift in the absorption spectrum is such that narrow nonoverlapping absorption lines exist for molecules containing the different isotopic species, then, in principle, light of the proper frequency will be absorbed only by and excite only atoms or molecules containing a particular isotopic species.

Laser isotopic separation is possible because the frequency purity of laser light is sufficient to be resonantly absorbed by the atoms of or molecules containing one isotopic species without affecting the atoms of or molecules containing other nonresonant isotopes. In any isotope separation process based on the selective excitation of isotopic species by tuned laser light, it is essential that the isotopic shift be as sharply delineated as possible. By selective excitation is meant the tuning of the laser light frequency to effect absorption by an optical absorption state of one isotope only.

To obtain very sharp spectral features, it is highly preferable that the isotopic mixture which is to undergo separation be in the gaseous state when it is irradiated with tuned laser light. Gaseous mixtures permit efficient interaction of the laser light with the desired isotopic species while at the same time limiting the possibility that selectively excited molecules will undergo scrambling, that is, transfer of their excitation to nonexcited species. It will be readily apparent that scrambling reduces the efficiency of isotope separation and if sufficiently severe may prevent any separation at all.

Even so, once selective excitation has been made to occur, there are numerous processes by which the selectivity may be lost. A primary loss mechanism even in the gaseous state is collisional energy transfer between molecules. Thus, it is highly desirable that the selectively excited species be quickly transformed to a stable or metastable state.

Unfortunately, the separation of isotopes of heavy elements is, in general, much more difficult than separation of isotopes of light elements. The isotope shifts of optical absorption lines are much smaller for compounds of heavy elements, and since most of the gaseous compounds of heavy elements are polyatomic, there exist a very large number of vibration-rotation states closely spaced in frequency. Selective light absorption is further complicated for heavy elements because at temperatures at which their compounds are gaseous, a large number of vibration-rotation states are excited. Diatomic compounds of heavy elements have simpler spectra but usually must be heated to relatively high temperatures before they exhibit any appreciable vapor pressure. The foregoing comments are particularly true when the heavy element of interest is uranium. The process is very important for substances which do not need spectrum simplification. However, atomic or molecular beams provide spectrum simplification for substances which require it.

It is thus apparent that it is desirable to somehow delineate the isotope shift of a compound of a heavy element further than is frequently possible at a temperature at which the compound has a substantial vapor pressure. This may readily be accomplished by making use of the fact that spectral separation and resolution of isotopically shifted absorption lines or narrow bands may be much improved by cooling the absorbing material. In fact, sufficient cooling results in clear-cut spectrum simplification. By spectrum simplification is meant essentially the removal of overlapping absorption features in order to isolate selectable isotopic absorption states. But cooling alone is not enough to achieve an efficient isotope separation process based on selective excitation of isotopic species. At the same time, while the material density must not be so high as to degrade the resolution by pressure broadening, it must be high enough to yield acceptable absorption in reasonable optical path length. When the equilibrium vapor pressure of the optically absorbing compound is unacceptably small at the desired lower temperature, an optimum state of the absorber, i.e., some reasonable density at the desired temperature, can be achieved by adiabatically expanding the gas. This can be done by a supersonic expansion which results in a state of very high supersaturation at a lower temperature in the high velocity gas stream.

When a fluid is expanded to supersonic velocities, a large reduction in pressure is required. Since the flow derives its energy from the internal energy and random motion of the fluid, a large reduction in the bulk fluid temperature also ensues. Apparatus for producing such a fluid expansion ranges from ordinary nozzles to molecular or atomic beam nozzles. A molecular or atomic beam apparatus comprises a nozzle with expansion walls normal to the flow direction and is operated at very high pressure ratios. In accordance with the invention, it is desirable to utilize the collisionless regime of a molecular or atomic beam. This is because in practicing the invention, the time between molecular collisions in the expanded fluid should be long to avoid scrambling and before separative processes occur between the laser-excited and unexcited molecules.

The cooling that can be achieved by the adiabatic expansion of a single gas is readily determined by the wellknown gas-dynamic relationship $$T/T_o = (P/P_o)^{(\gamma-1)/\gamma} \quad (2)$$

where the subscript zero denotes pre-expansion conditions and $\gamma$ is the ratio of specific heats. Temperatures which are considerably below the condensation point can be achieved by this technique. Thus, the gas will remain supersaturated at high mach numbers. The lower limit attainable by this method depends upon the nuclear condensation of the particular gas. If the gas containing the isotopic species to be separated has a low $\gamma$, it can be cooled substantially more by the addition of a so-called carrier gas. The carrier gas should have a high $\gamma$ in order to maximize the effective $\gamma$ of the mixture and thereby minimize $T/T_o$ for a given $P/P_o$ ratio. The monatomic gases (noble gases) have $\gamma = 1.67$ and are particularly suitable for this purpose.

Whenever a photon having a selected frequency excites a molecule of a particular isotope, another photon of that frequency will stimulate the molecule so excited to emit a photon. The physical recoil of the molecule for both absorption and stimulated emission is dependent on the direction of the photon causing either of the phenomena.

FIG. 1a illustrates absorption of a photon by a molecule. As can be seen, when a photon traveling in a particular direction is absorbed by a molecule, the molecule also essentially absorbs the momentum of the photon and achieves an incremental increase in velocity in the direction the absorbed photon was moving. Naturally, the amount of velocity picked up by the molecule from one photon is extremely small. If for example, the momentum of a photon, such as from a laser beam is represented by P, (it can be shown that)

$$P = h/\lambda \quad (3)$$

where h is Planck's constant and $\lambda$ is the wavelength of the photon. For a photon wavelength $\lambda$ of 10 microns, $$P = (6.6 \times 10^{-27} \text{ gm cm}^2\text{sec})/10^{-3} \text{ cm sec}^2$$

Therefore, $P = 6.6 \times 10^{-24}$ gm cm/sec which certainly is not very much momentum for a large molecule such as $UF_6$ to gain. If, for example, a $UF_6$ molecule absorbs such a photon traveling perpendicular to the thermal velocity path of the molecule, the molecule will be deflected only about $10^{-6}$ radians. This is illustrated as follows: Assuming a right angle collision and a molecular deflection of $\theta$, $$\theta = \vec{P}_{photon}/\vec{P}_{molecule} \quad (4)$$

where $\vec{P}_{photon}$ is the momentum of the photon and $\vec{P}_{molecule}$ is the momentum of the molecule. The kinetic energy of the molecule can be represented by the following well-known equation from thermodynamics.

$$(3/2)kT = \tfrac{1}{2}mv^2 \quad (5)$$

where k is the Boltzmann constant, T the kinetic temperature of the molecule, m the mass of the molecule and v the thermal velocity of the molecule. Solving equation (5) for v gives us a thermal velocity for $UF_6$ of on the order of $10^4$ cm/sec, where m = 352 amu and T 50° K. A T of 50° K. is typical of the molecules in a molecular beam.

Equation (4) can be rewritten as $$\theta = h/\lambda m_{UF_6} v_{UF_6}$$

where h is Planck's constant, $\lambda$ the wavelength of the photon, $m_{UF_6}$ the mass of a $UF_6$ molecule, and $v_{UF_6}$ the thermal velocity of a $UF_6$ molecule. Solving, we write $$\theta = (6.6 \times 10^{-27} \text{erg sec}$$
$$\text{sec})/(10^{-3} \times 352_{amu} \times 1.66 \times 10^{-24} \, 10^4 \text{ gm}$$
$$\text{cm}^2) = 10^{-6} \text{ radians.}$$

The inherent divergence of a molecular beam of useful number density is approximately $10^{-2}$ rad, at best. Coupling in subsequent photons to improve the situation is still limited, however, by a $10^{-3}$ sec relaxation time, in which the molecule travels 10 cm. In addition, these divergences are not very effective because they originate from origins displaced from the origin of the initial beam divergence. Thus, photodeflection by resonant laser absorption does not appear to be practical. In fact, to get the molecules in a molecular beam deflected sufficiently far apart for collection by one such interaction would require a high vacuum conduit from 1 to 10 kilometers long! Such a long evacuated tube would be required to operate the one photon absorption device disclosed in U.S. Pat. No. 3,558,877 to Pressman issued Jan. 26, 1971. Clearly, no one could build and operate such an impractical device today.

In contrast, the approach of the instant invention is quite subtle and complex, utilizing deexcitation by stimulated emission to remove the limiting relaxation time condition and to allow a very large number of photodeflections. The invention uses multiple stimulated emission and absorption transitions by tailoring an exciting laser to emit $\pi$-pulses.

Figure 1B:
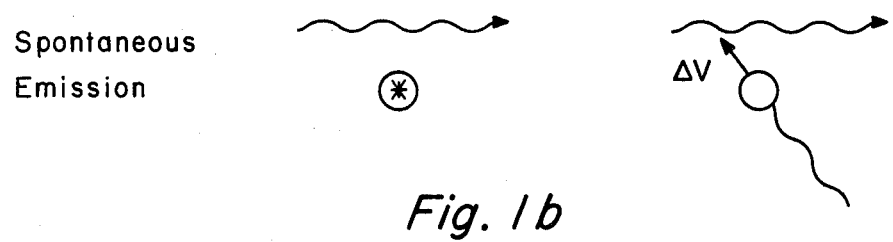
Figure 1C:
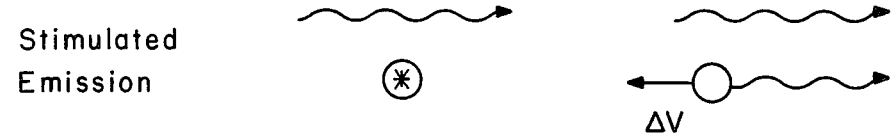

If such a laser is used as the first source of $\pi$ pulses, a second source of $\pi$-pulses (such as a second laser or a reflection of the beam from the first source) traveling in the opposite direction to the photons from the first source, and also substantially perpendicular to the molecular beam, stimulates the molecules excited by photons from the first beam to emit. The two photodeflections cause changes in velocity of the responsive molecule. Photodeflection of excited molecules stimulated to emit recoil when emitting, is illustrated in FIG. 1c. Spontaneous emission is shown in FIG. 1b. As is well known, spontaneous emission is isotropic and is to be distinguished from stimulated emission. The stimulated emission of the present invention however, is directionally dependent on the stimulating photon. When a molecule emits in response to photon stimulation, it emits a photon traveling in the same direction as the stimulating photon and hence recoils in a direction opposite to that of the emitted photon. The net result of stimulated emission is another incremental change in velocity of the molecule. To obtain the net change in momentum of a molecule in response to an excitation-stimulated emission cycle, one subtracts the momentum vector of the stimulation emitted photon from the momentum vector of the absorbed photon. It is apparent that if the two vectors are opposite in direction, maximum photodeflection of the molecule is achieved. In such a case, two changes in molecular momentum or velocity take place in the same direction.

In accordance with the invention, if a 1 cm high molecular beam comprising $^{235}UF_6$ and $^{238}UF_6$, produced in a conventional manner, is intercepted at right angles by a 1 cm diameter laser beam comprising a frequency absorbed by one isotope of the molecule, and the laser beam reflected back through the molecular beam, also at substantially right angles to the molecular beam, many absorption-stimulated emission cycles each one of which moves an affected molecule in essentially the same direction can be made to occur.

If the reflector and the front end of the laser are about 10 cm apart, it will take $10^{-4}$ sec for one molecule in the molecular beam to cross the light beam with the molecule traveling at $10^4$ cm/sec, at a kinetic temperature of 50° K. The round trip distance for the light beam is 20 cm. The round trip time T for a photon is the distance (20 cm) divided by the velocity of light ($3 \times 10^{-}$cm/sec) or about $7 \times 10^{-10}$ seconds. The number of photon-molecule interactions within the time T, is then equal to the time the molecule is in the light beam ($10^{-4}$ seconds) divided by the round trip time of the light ($7 \times 10^{-10}$ seconds) or about $1.4 \times 10^5$ interactions!

Because the molecular deflection $\theta$ is $10^{-6}$ radians per interaction, the molecule will deflect $1.4 \times 10^5 \times 10^{-6} = 0.14$ radians, or about 7–8 degrees during the time it passes through the light beam!

In order to insure that an effective number of the molecules of the isotope selected for interaction are initially excited by the beam from the laser, a $\pi$-pulse is used.

The interaction of a $\pi$-pulse of photons with a molecule is a coherent interaction. A coherent interaction is one where the high-frequency dipole movement (polarization) induced in the molecule by the photon does not attenuate spontaneously during the time of the interaction. This means that the duration of the $\pi$-pulse ($\tau_p$) as well as the times between $\pi$-pulses, alternating from either of two opposite sides of the molecule, should be much shorter than the damping of the molecule due to different relaxation mechanisms ($T_2$), e.g. scrambling collisions or collisions with molecules other than $UF_6$. In the case of $\pi$-pulses (exact resonance i.e., $\omega = \omega_o$) when the phase velocity of the pulse in the molecule containing medium is equal to c, the following coupled partial differential equations may be used to describe the system.

$$\partial\epsilon/\partial t + c(\partial\epsilon/\partial x) = -(\alpha/2)c\epsilon + 2\pi\omega\,\mathcal{P} \quad (6)$$

$$\partial\epsilon/\partial t + (1/T_2)\mathcal{P} = (\mu^2/\hbar)N \quad (7)$$

$$\partial N/\partial t = -(1/\hbar)\epsilon\,\mathcal{P} \quad (8)$$

$T_2$ is the transverse relaxation time of molecules within the medium, $\hbar$ is Planck's constant, $\epsilon$ is the electric field of the laser used, $\mathcal{P}$ is the induced polarization of the molecules, $\mu$ is the molecular electric dipole movement, $\alpha$ is the linear absorption coefficient, N is molecular density, t is time, x is a spatial coordinate.

The reaction of the medium to the light pulse depends strongly on the field intensity. If the field is weak, so that $\mu\epsilon/\hbar \lesssim \tau_p^{-1}$, (where $\tau_p$ is the pulse width) then the population of the levels does not change noticeably under the influence of the field, and the attenuation is linear. Nonetheless, owing to the fact that $\tau_p \lesssim T_2$, i.e. the width of the spectrum of the pulse is comparable with or even larger than the width of the absorption line $2/T_2$, the shape of the pulse changes during the propagation. This can be readily understood by considering the reaction of the medium to a weak $\delta$-pulse $\epsilon_0\delta(t-t_0)$, where $\delta(t=t_0)$ is the delta function. The polarization of the medium in the field of such a pulse is given by $\mathcal{P} = (\mu_2/\hbar)N_0\epsilon_0 \exp[(t_0-t)/T_2]$, where $t > t_0$. Since the polarization is conserved for a time $\sim T_2$, the medium absorbs or radiates during that time independently of the pulse duration. It is clear that a pulse of duration $\tau_p << T_2$ will broaden upon propagation to a value on the order of $T_2$, and its propagation velocity will be somewhat smaller than c.

An entirely different picture is presented by the evolution of a powerful pulse, for which $\mu\epsilon/\hbar \gtrsim \tau_p^{-1}$. In this case the response of the medium is oscillatory. Indeed, when $\tau_p << T_2$ we can neglect the relaxation of the polarization in equation (7), and we obtain the following solution for material equations:

$$N = N_o \cos\theta,\, \mathcal{P} = \mu N_0 \sin\theta, \quad (9)$$

where $$\theta = \frac{\mu}{\hbar} \int_{-\infty}^{\infty} \epsilon(t,x)dt. \quad (10)$$

The change of N and $\mathcal{P}$ can be represented as the rotation of a unit vector in the (x,y) plane in such a way that the x component of the vector corresponds to $N/N_0$, and the y component to $\mathcal{P}/\mu N_0$. Then the function $\theta$ is the angle of rotation of this vector: $\theta = \pi$ corresponds to a complete transition of the particle from the lower level to the upper level on absorption and from the upper level to the lower level on stimulated emission (this defines the $\pi$-pulse) and $\theta = 2\pi$ corresponds to a complete return to the upper level.

The change of the pulse energy is described by the equation $$dE/dx = N_0(1 - \cos\theta) - \alpha E, \quad (11)$$

which differs significantly from the case of an incoherent interaction. In the absence of linear losses ($\alpha = 0$), the attenuation of the pulse energy is determined completely by the change of the angle of rotation $\theta$ under the influence of this pulse.

It is important to realize that during its propagation through an unexcited medium (comprising both "responsive and unresponsive" isotopes of a selected molecule), the $\pi$-pulse excites substantially all of the responsive molecules. Furthermore, a $\pi$-pulse propagated through an excited medium (also comprising both "responsive and unresponsive" isotopes of a selected molecule), acquires practically all the energy of the excited molecules.

A greatly detailed discussion on the $\pi$-pulse is carried out by P. G. Kryukov and V. S. Letokhov in "Propagation of a Light Pulse in a Resonantly Amplifying (Absorbing) Medium," Soviet Physics, Vol. 12, No. 5, March-April 1970, pp. 99–124.

Further reference on the nature of $\pi$-pulses may be had in an article by C. K. N. Patel and R. E. Slusher entitled, "Self-Induced Transparency in Gases," Physical Review Letters, Vol. 19, No. 18, Oct. 30, 1967, pp. 1019–1022 and in an article by S. L. McCall and E. L. Hahn entitled, "Self-Induced Transparency by Pulsed Coherent Light," Physical Review Letters, Vol. 18, No. 21, May 22, 1967, pp. 908–911.

The $\pi$-pulse excites substantially all of the molecules of the responsive isotope at a particular temperature. Thus, the reflected pulse, still a $\pi$-pulse, encounters essentially only excited molecules, encountering only a trivial number of unexcited molecules, if the pulse is truly a $\pi$-pulse. Thus, it is assured that the $\pi$-pulse responsive molecules recoil in the same direction, or nearly so, with each interaction to effect a net coherent movement in one direction.

Of course, if only random excitation-stimulated emission would be produced, there would be no net molecular movement. Also, if the series of interactions are not made to occur in less than the mean intermolecular collision time, scrambling will occur and defeat the effort toward enrichment or separation. Thus, for photodeflection to truly work in practice, criteria that all interactions to a responsive molecule must occur within a reasonable time, (less than the mean free time between inelastic collisions) that a significant number of interactions must occur to each responsive molecule, and that the laser beam must excite and stimulate to emission a suitable number of the molecules of a particular isotope in the molecular beam on each pass of the laser beam must be satisfied. The instant invention satisfies all of these criteria.

Figure 2:
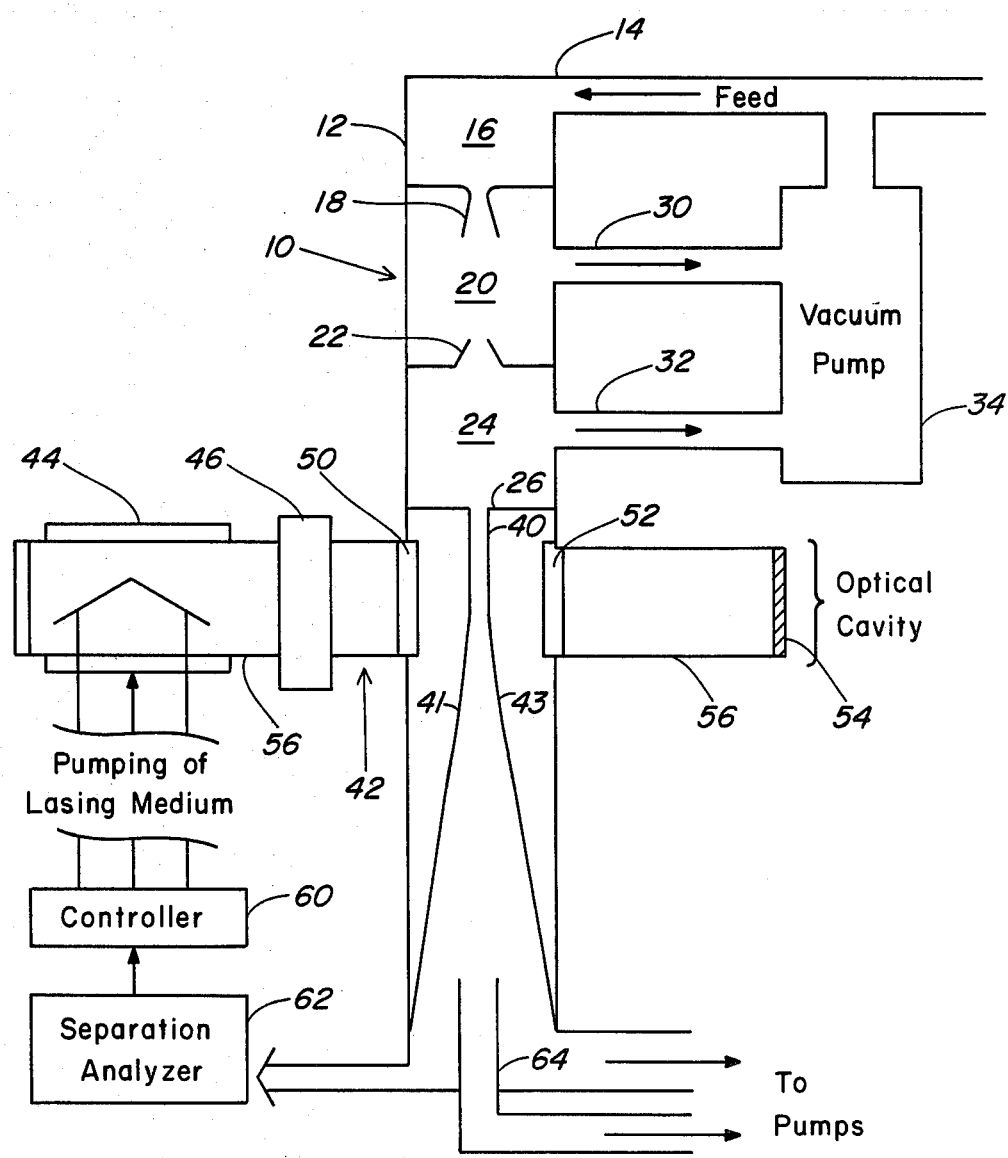

Reference is now made to FIG. 2, which illustrates an apparatus in accordance with a preferred embodiment of the invention. As seen therein, a portion 10 of an evacuated drift tube 12 comprises a molecular beam production facility. Gaseous molecules containing at least two isotopes of the element of interest are fed in through an entrance feed line 14 into a pressure chamber 16. A nozzle 18 communicating between pressure chamber 16 and an evacuated expansion chamber 20 provides for adiabatic expansion of the gaseous molecules passing therethrough. As molecules pass through nozzle 18, they cool, but accelerate. Thus, their temperature is reduced, and the energy obtained thereby is transferred to speed them through a skimmer 22 into a second evacuated chamber 24. Skimmer 22 acts to separate out from all the molecules within expansion chamber 20, those moving in the desired direction, i.e., toward a beam collimator 26. Expansion chambers 20 and 24 are evacuated through conveniently located conduits 30 and 32, respectively, connected to a suitable vacuum pump 34. Preferably, molecules evacuated from chambers 20 and 24 by vacuum pump 34 return to feed conduit 14 for recycling through the molecular beam production facility 10. Clearly, those molecules not passing through skimmer 22 from chamber 20 and those molecules not passing through beam collimator 26 from chamber 24, are the molecules evacuated from chambers 20 and 24 through conduits 30 and 32, respectively, to vacuum pump 34. Those molecules passing through beam collimator 26 form a molecular beam 40.

Beam collimator 26 is typically a slit, and can produce a beam having a cross section of, for example, 0.1 mm to 1 mm "wide" and 1 cm to 2 cm "high." As seen in FIG. 2, the narrow width of the beam is measured in the plane of the paper and the beam height perpendicular to the plane of the paper. It will be appreciated by those skilled in the art that the foregoing description of a molecular or atomic beam production facility is by way of example only. Other types of molecular or atomic beam producing systems are well known to those in the art. The invention is not limited to use with the molecular beam production facility shown. Any other facilities capable of producing a beam of suitable parameters may also be used.

Disposed to produce a beam of light intercepting the molecular beam 40 is an optical system 42. In the preferred embodiment, a laser 44 and a pulse modulator 46 are aligned to produce $\pi$-pulses intercepting beam 40 at right angles to the broad side 41 of beam 40. In accordance with the invention, the light beam is not limited to the right angle intersection and other angles such as 60° or 30° may be used. However, it will be appreciated by those skilled in the art that a substantially perpendicular light beam-molecular beam intersection will produce the widest divergence between the excitable and non-excitable isotopes. Thus, the right angle beam intersection is preferred.

Windows 50 and 52 maintain a suitable high vacuum environment for molecular beam 40 in drift tube 12. A reflector 54 is mounted so as to reflect light from laser 44 back through beam 40, impinging on the broadside 43 of beam 40. Laser 44, modulator 46 and reflector 54 therefore provide an optical cavity through which molecular beam 40 moves. An appropriate laser cavity enclosure 56 provides a suitable environment for the optical cavity.

Those skilled in the art will appreciate that reflector 54 need not be disposed to reflect light from laser 44 back through molecular beam 40 at right angles thereto, although this is the most efficient mode for the reasons above set forth. Thus, reflector 54 could direct light at a nonperpendicular angle onto side 43 of beam 40. Reflector 54 could even be replaced with another laser, although this would be an energy-wasting alternative. Another reason right angle interception for the light going both ways is efficient is that perpendicularity of the molecular and light beams yield superimposed beam cross sections to bring about the occurrence of a maximum number of absorption-stimulated emissions cycles for any responsive molecule in the molecular beams passing through the light beam. In addition, there is no remnant light beam impinging on only one side of the molecular beam to undo any of the beam divergence work done by the absorption-stimulated emission cycles.

A laser controller 60 modulates the output of laser 44 in response to the output from a separation analyzer 62. Laser controllers and separation analyzers are well known to those skilled in the art so no further description of them need be made herein.

In the preferred embodiment, a beam corer 64 receives the central, relatively unaffected portion of beam 40 and pumps it, for recycling for processing through the same or another FIG. 2 apparatus, or for disposal. The enriched divergent portions of the beam 40 are collected for a rerun through the same apparatus or another, or as the final product of isotope separation if sufficiently enriched. Naturally, repeated runs are needed to obtain pure or nearly pure samples of the selected isotope.

Because it cannot be determined whether a photon from the "original" 0 or the "reflected" beam will first be absorbed by a molecule in beam 40 entering the light beam, the molecule can move either way. Which way it goes will depend on this first absorption direction. Thus, molecules containing the light responsive isotope diverge into two directions rather than one. Because $\pi$-pulses are used, once a molecule absorbs its first photon, its chances of receiving stimulated emission to move it farther in the same direction and repeating the cycle for a net movement of the desired amount are very great.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A method for inducing separation between two isotopes in a molecular beam using a laser emitting a beam of a selected wavelength, the selected wavelength being one that will be absorbed by unexcited molecules of one isotope and will stimulate emission by excited molecules of the one isotope, the method comprising the steps of:
   impinging a laser beam comprising $\pi$-pulse of the selected wavelength onto the molecular beam at a first angle of incidence and in a first direction to thereby excite molecules in the molecular beam, causing them to move essentially in the first direction in response thereto;
   impinging a laser beam comprising $\pi$-pulse of the selected wavelength into the molecular beam in a second direction to cause stimulated emission of the molecules excited by the first direction beam, causing such emitting molecule to move opposite to the second direction; and
   collecting the molecules so moved by the excitation and stimulation.

2. The invention of claim 1 wherein the first and second directions are essentially opposite so that excitation and stimulated emission move the molecules in essentially the same direction.

3. The invention of claim 2 wherein for each molecule, excitation and stimulation are made to occur a plurality of times to cause for each such molecule a plurality of molecular movements in essentially the same direction.

4. The invention of claim 3 wherein said directions are substantially perpendicular to the broad side of the molecular beam.

5. The invention of claim 4 wherein said plurality of molecular movements cause the affected molecules to diverge from said beam from between about 4 and about 8 degrees.

6. An apparatus for inducing separation between two isotopes comprising:
   means for producing a molecular beam;
   first means for impinging light traveling in a first direction onto molecules within said beam, said light comprising laser $\pi$-pulses of a wavelength which will excite and stimulate molecules comprising only one of said isotopes to thereby cause the molecules of said one isotope to move essentially in said first direction;
   second means for impinging light comprising laser $\pi$-pulse of said selected wavelength traveling in a second direction upon said molecules within said beam to stimulate emission of said molecules comprising only said one isotope to cause said stimulated molecules to move in a direction opposite to said second direction; and
   means for collecting molecules which were excited and stimulated to emit.

7. The invention of claim 6 wherein said first and second directions are substantially opposite.

8. The invention of claim 6 wherein said first means comprises a laser disposed on one side of said molecular beam and said second means comprises means for reflecting light from said laser back through the molecular beam disposed on the other side of said molecular beam.

9. The invention of claim 8 wherein said laser and said reflecting means are disposed such as to pass light substantially perpendicular to the wide flat sides of said molecular beam.

10. A process for the separation of one isotopic species from a mixture of isotopes, which comprises the steps of generating a beam of the atoms or molecules, introducing said beam into a laser cavity for providing a direction of the laser beam substantially perpendicular to the direction of motion of said atom beam, irradiating said atom beam with a sufficient radiation for bringing about the excitation of only the isotopic species to be separated, said radiation being by means of $\pi$-pulses of radiation, said laser being operated in a $\pi$-pulsed mode, reflecting said $\pi$-pulsed laser beam back and forth between at least a pair of opposed sides of said laser cavity for deflecting said isotopic species, and collecting said species.

11. A process as claimed in claim 10, wherein the beam is one of the uranium atoms.

12. A process as claimed in claim 10, wherein said reflecting step comprises providing a pair of opposed and parallel mirrors on said pair of opposed sides of said laser cavity for reflecting said laser beam back and forth therebetween.

13. A process in accordance with claim 10, wherein said reflecting step comprises the step of making said radiation $\pi$-pulses travel back and forth in said laser cavity for transferring a plurality of quanta of momentum to said atoms or molecules of said isotopic species by exciting the absorbing atoms or molecules when the $\pi$-pulses traverse the cavity in one direction and deexciting said absorbing atoms or molecules when the $\pi$-pulses traverse the cavity in the opposite direction, said plurality of quanta of momentum transferred atoms or molecules of said isotopic species being deflected out of said beam.

14. A device for the separation of an isotopic species out of a mixture of isotopic species, comprising in combination a means for generating at least one narrow atomic or molecular beam, means for irradiating these beams by means of a controlled $\pi$-pulsed radiation of desired wavelength, means for reflecting said $\pi$-pulsed radiation back and forth in a direction substantially perpendicular to the direction motion of said beams and means for collecting the separated desired isotopic species.

* * * * *